(12) United States Patent
Hands

(10) Patent No.: US 7,197,452 B2
(45) Date of Patent: Mar. 27, 2007

(54) MULTIMODAL QUALITY ASSESSMENT

(75) Inventor: David S Hands, Essex (GB)

(73) Assignee: British Telecommunications public limited company, London (GB)

( * ) Notice: Subject to any disclaimer, the term of this patent is extended or adjusted under 35 U.S.C. 154(b) by 596 days.

(21) Appl. No.: 10/469,043

(22) PCT Filed: Mar. 8, 2002

(86) PCT No.: PCT/GB02/01074

§ 371 (c)(1),
(2), (4) Date: Aug. 26, 2003

(87) PCT Pub. No.: WO02/078358

PCT Pub. Date: Oct. 3, 2002

(65) Prior Publication Data

US 2004/0068398 A1   Apr. 8, 2004

(30) Foreign Application Priority Data

Mar. 23, 2001  (EP) .................................. 01302689

(51) Int. Cl.
G10L 10/00 (2006.01)
(52) U.S. Cl. .................... 704/200.1; 704/270; 704/201
(58) Field of Classification Search ................ 704/270, 704/275–278, 201, 200.1; 341/50; 348/180, 348/192, 194; 358/426.01; 382/212; 455/67.14; 715/500.1

See application file for complete search history.

(56) References Cited

U.S. PATENT DOCUMENTS

| | | | | |
|---|---|---|---|---|
| 4,455,634 A | * | 6/1984 | Efron et al. | 369/53.41 |
| 5,434,592 A | * | 7/1995 | Dinwiddie et al. | 345/629 |
| 5,473,363 A | * | 12/1995 | Ng et al. | 348/14.09 |
| 5,596,364 A | * | 1/1997 | Wolf et al. | 348/192 |
| 5,740,187 A | * | 4/1998 | Tanaka | 714/755 |
| 5,799,132 A | | 8/1998 | Rizzotto et al. | |
| 5,848,384 A | * | 12/1998 | Hollier et al. | 704/231 |
| 5,940,792 A | | 8/1999 | Hollier | |
| 6,035,270 A | | 3/2000 | Hollier et al. | |
| 6,119,083 A | | 9/2000 | Hollier et al. | |
| 6,141,042 A | * | 10/2000 | Martinelli et al. | 348/181 |
| 6,208,326 B1 | * | 3/2001 | Frederick et al. | 345/690 |

FOREIGN PATENT DOCUMENTS

| | | |
|---|---|---|
| EP | 0869684 A2 | 10/1998 |
| EP | 0986269 A2 | 3/2000 |

(Continued)

OTHER PUBLICATIONS

Beerends et al, "The Influence of Video Quality on Perceived Audio Quality and Vice Versa", Journal of the Audio Engineering Society, vol. 47, pp. 355-362 (1999).

(Continued)

*Primary Examiner*—Vijay Chawan
(74) *Attorney, Agent, or Firm*—Nixon & Vanderhye P.C.

(57) ABSTRACT

The quality of audiovisual material is assessed by measuring the audio an video quality and computing from these a combined measure. Using a parameter indicative of the degree of motion represented by the video, the computation employs one of a plurality of algorithms selected in dependence on the value of the parameter.

7 Claims, 1 Drawing Sheet

FOREIGN PATENT DOCUMENTS

| | | |
|---|---|---|
| WO | WO 94/00922 | 1/1994 |
| WO | WO 00/01165 | 1/2000 |
| WO | WO 00/22803 | 4/2000 |
| WO | WO 00/48407 | 8/2000 |

OTHER PUBLICATIONS

Hollier et al, "Multi-Modal Perception", BT Technology Journal, vol. 17, No. 1, pp. 35-46 (1999).

Ansi T1A1.5/94-124: "Combined A/V Model with Multiple Audio and Video Impairments", New York, (1995).

Petersen, et al., "Modeling and Evaluation of Multimodal Perceptual Quality", IEEE Signal Processing Magazine, IEEE Inc., New York, US, vol. 17, No. 4, Jul. 1, 1997, pp. 38-39.

Hollier et al., "Error-activity and Error Entropy as a Measure of Psychoacoustic Significance in the Perceptual Domain", IEEE Proceedings—Vision, Image and Signal Processing, vol. 141, pp. 203-208, 1996.

Karunasekera et al., "A Distortion Measure for Blocking Artifacts in Images Based on Human Visual Sensitivity", IEEE Transactions on Image Processing, vol. 4, pp. 713-725, 1995.

Ran et al., "A Perceptually Motivated Three-Component Image Model—Part I: Description of the Model", IEEE Transactions on Image Processing, vol. 4, pp. 401-415, 1995.

ITU-R Rec. BT. 500-10: "Methodology for the Subjective Assessement of the Quality of Television Pictures", Geneva, 2000.

ITU-T Rec. P.810: "Modulated Noise Reference Unit (MNRU)", Geneva, 1996.

Narita, "Subjective-Evaluation Method for Quality of Coded Images", IEEE Transactions on Broadcasting, vol. 40, pp. 7-13, 1984.

Narita et al., "On an Absolute Evaluation Method of the Quality of Television Sequences", IEEE Transactions on Broadcasting, vol. 43, pp. 26-35, 1997.

Jones et al., "Development of Opinion-Based Audiovisual Quality Models for Desktop Video-Teleconferencing", IEEE 6$^{th}$ International Workshop on Quality of Service (IWQoS'98), Napa, California May 18-20, 1998.

Hollier et al, "Towards a Multimodal Perceptual Model", BTTJ, vol. 15, No. 4, pp. 163-172, 1997.

Rix et al., "Models of Human Perception", BTTJ, vol. 17, No. 1, 24-34, pp. 1515-1518, 2000.

Rix et al., "Models of Human Perception", BTTJ, vol. 17, No. 1, pp. 24-34, 1999.

Beerends et al., "A Perceptual Audio Quality Measure Based on A Psychoacoustic Sound Representation", J. Audio Eng. Soc., vol. 40, No. 12, 1992.

Dixon et al., "The Detection of Auditory Visual Desynchrony", PERCEPTION, vol. 9, pp. 719-721 (1980).

Rihs, "The Influence of Audio on Perceived Picture Quality and Subjective Audio-Video Delay Tolerance", Race Mosaic deliverable R211180CESR007.B1, 1995.

Macdiarmid et al., "Double-Stimulus Assessment of Television Picture Quality", EBU Review—Technical, vol. 192, pp. 70-79, 1982.

\* cited by examiner

MULTIMODAL QUALITY ASSESSMENT

This application is the U.S. national phase of international application PCT/GB02/01074 filed 8 Mar. 2002 which designated the U.S.

BACKGROUND

1. Technical Field

The present invention is concerned with quality measurement of audio-visual material, that is moving pictures transmitted (or recorded) with accompanying sound, as for example a television transmission or such material delivered via digital telecommunications networks such as the internet.

2. Related Art

The quality of audio and/or video signals has been measured by various techniques (e.g., such as may be described in prior U.S. Pat. Nos. 5,940,792, 5,848,384, 6,035,270, 5,799,132 and 6,119,083). However improvements are still desirable.

BRIEF SUMMARY

Accordingly to an exemplary embodiment of the present invention there is a provided a method of measuring the quality of audio-visual material comprising:

(a) analyzing the quality of an audio signal to produce an audio quality measurement;

(b) analyzing the quality of a video signal to produce a video quality measurement;

(c) receiving a parameter indication of the degree of motion represented by the video signal;

(d) computing, from the audio quality measurement and video quality measurement, a single measurement employing one of a plurality of algorithms selected in dependence on the value of the parameter. In a preferred arrangement, step (d) may comprise computing, from the audio quality measurement and video quality measurement, a single measurement employing an algorithm in which the relative contributions of the audio signal measurement and the video signal measurement are weighed in dependence on the value of the parameter.

BRIEF DESCRIPTION OF THE DRAWING

Some embodiments of the present invention will now be described, by way of example, with reference to the accompanying drawings, in which the single

DETAILED DESCRIPTION OF EXEMPLARY EMBODIMENTS

Figure 1:
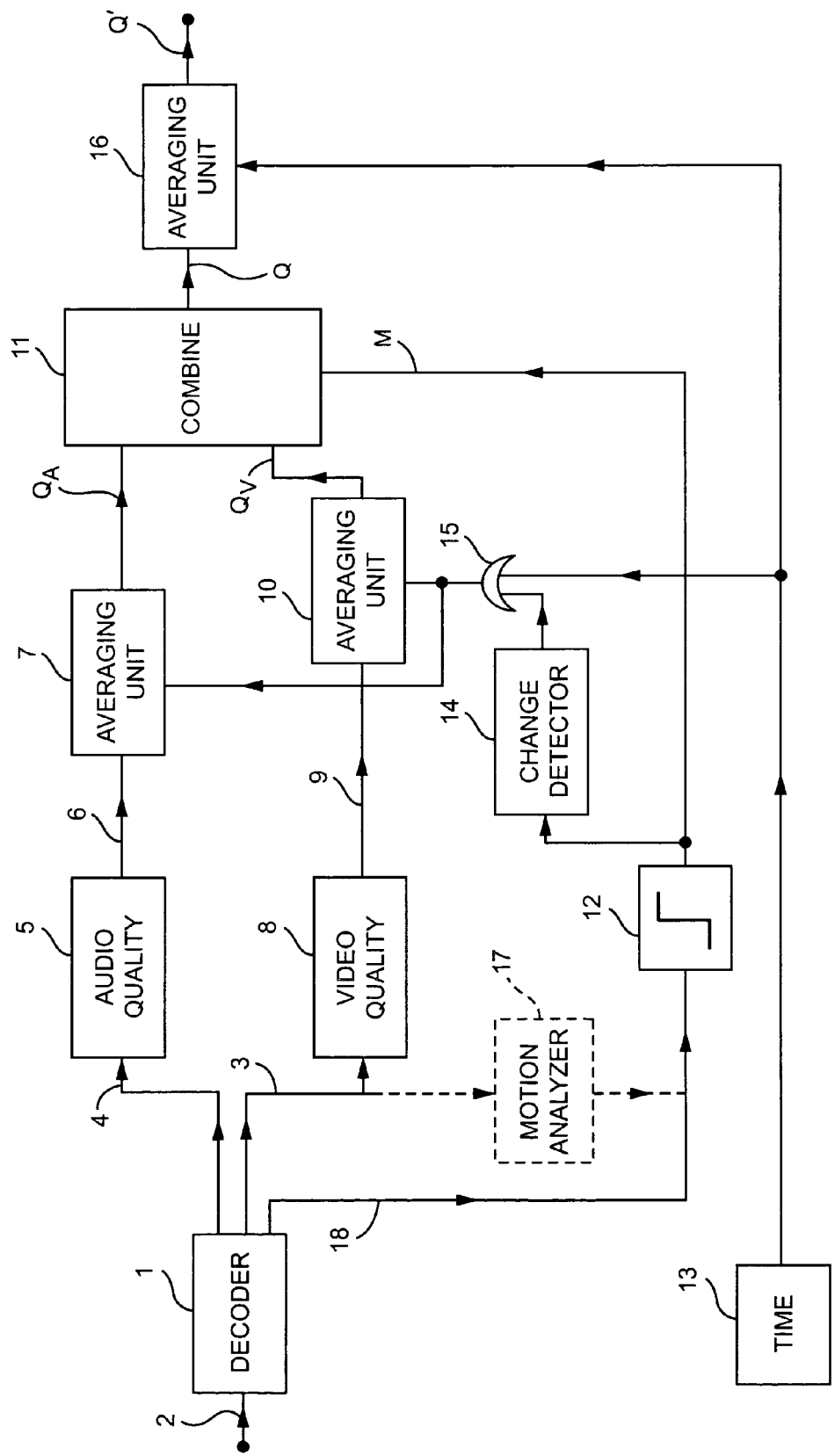
FIG. 1 is a block diagram of one form of apparatus for implementation of the invention.

In FIG. 1, a video and audio decoder 1 is shown receiving coded signals at an input 2. In this example the video part of the decoder is a decoder operating in accordance with the MPEG2 standard and produces a digital, uncompressed video signal at 3. The audio part of the decoder may operate according to any of the usual audio coding algorithms and produces a digital audio signal at 4.

An audio quality measurement unit 5 analyzes the quality of the audio signal at 4. Thus at its output 6 the unit 5 produces a digital signal representative of the decoded audio quality. This output is averaged by an averaging unit 7 which, when triggered, produces an output representative of the output of the quality measurement unit 5, averaged over the period since it was last triggered.

Similarly the quality of the video signal at 3 is measured by a video quality measurement unit 8. At its output 9 the unit 8 produces a digital signal representative of the decoded video quality which is averaged periodically at averaging unit 10.

The two averaged measurements are continued into a single measurement in a combiner unit 11 in a manner which takes into account the content of the received signal, and more particularly the degree of motion. For this purpose the video part of the decoder 1 also outputs at 18 a motion activity parameter defined by the syntactic structure description scheme of the MPEG 7 standard. This scheme has five descriptor attributes which detail the intensity, direction, spatial distribution, spatial localization and temporal distribution of motion activity. The attribute of interest for present purposes is the intensity attribute which is a 3-bit number indication one of five levels of intensity. These are 1—very low activity; 2—low activity; 3—medium activity; 4—high activity; and 5—very high activity. In this example, cognizance is taken only of two levels of activity and hence a thresholding device 12 serves to produce a parameter M having the value "1" for input values of 3 or above, and "0" otherwise.

The combiner unit 11 also receives the output of the thresholding device 12 and combines the audio and video quality measures according to the following algorithm. More particularly it takes account not only of the interdependence of the subjective effect of quality degradations but also of the fact that the relative contribution of the audio and video to the overall perceived quality depends on the degree of motion in the picture. If the audio quality from unit 7 is $Q_A$ and the video quality measure from the unit 10 is $Q_V$, a and b are subjective weightings assigned to the importance of video and audio-video qualities and c a constant, then, in this example the unit 9 calculates an overall measure $$Q = a \cdot Q_V + b \cdot Q_A \cdot Q_V + c$$

where however, the values of a, b and c are different according to the value of the thresholded motion intensity M, for example:

if $M=0$, then $a=0$; $b=0.17$; $c=1.15$.

if $M=1$, then $a=0.25$; $b=0.15$; $c=0.95$.

Note that these particular values assume that $Q_A$, $Q_V$ and Q each have a range from 0 (lowest quality) to 100 (highest quality). Naturally if the values supplied by the measurement units 5, 8 do not cover this range, they can be scaled appropriately.

The triggering of the averaging units 7, 10 is performed by pulses from a timing unit 13 which generates pulses at regular intervals, e.g. every 10 seconds. One could employ such regular triggering, so that a new value of Q is produced every 10 seconds, but in practice this is non-optimum if the degree of motion changes during the 10-second period and therefore we prefer to trigger the averaging units additionally whenever the degree of motion changes. This change is recognised by unit 14 which, whenever the value of M changes, produces an additional pulse which is supplied to the averaging units 7, 10 via an OR-gate 15. To ensure that final output values are nevertheless generated at regular intervals, the combined values Q are averaged over each 10-second period by a further averaging unit 16.

If it is desired to analyse signals which do not carry the MPEG7 (or similar) metatada, the apparatus may instead perform its own analysis of the motion content using a motion analysing unit 17 (shown dotted in FIG. 1). This receives the video signals from 3 and analyses them (for example as prescribed in the MPEG7 standard) to produce a signal to feed to the combiner unit 11.

Although the various integers of the measurement apparatus are shown as separate entities, if desired some, or indeed all, of them may be implemented by a general-purpose program-controlled processor driven by suitable software.

The apparatus can be used simply as a measurement tool for use in the development of multimedia systems, for example in the testing of different coding algorithms. Alternatively, it can be located in a component of a digital network, such as a router, a server or a client terminal. For example at the terminal it could be used to feed back quality of service information to monitor whether quality of service (QoS) targets/contractual assurances are indeed met, or to identify problems (i.e. fault diagnosis) in a network, or be used to ensure service level agreements (SLAs) are satisfied. Secondly, the apparatus has much more general uses. These uses are for the measurement of system/application performance and are extremely valuable as a means of setting agreements and ensuring contractual agreements are met. For example, in setting up vendor agreements, the apparatus can be used as the measure of performance criteria, e.g. if the vendor agrees to provide service performance equal to or above "fair" QoS as measured by the multimodal method described above. Further, the apparatus can reside in clients, servers or routers to provide feedback to service providers on: a) service performance, b) fault diagnosis. Note that it could potentially be used to optimise system performance—e.g. QoS information provided at the client could be fed back to the server, if performance is too poor, then the server should increase QoS to the client, if the QoS is too good, the server can reduce QoS (especially important when there is high usage on the server).

Some suitable algorithms that may be used for the audio and video quality measurement are described in a number of patents granted to the present applicant. For some of the applications discussed above, for example where the measurement apparatus is located in a router, one needs a method of measurement which operates on real signals, without having an undistorted copy of the original available for comparison purposes. Such algorithms, suitable for implementing the audio quality measurement unit 5, are described in U.S. Pat. No. 5,940,792
U.S. Pat. No. 5,848,384
U.S. Pat. No. 6,035,270
U.S. Pat. Nos. 5,799,132 and 6,119,083
whilst a non-intrusive technique for video quality measurement, that may be used for implementing the video quality measurement unit 7, is described in U.S. Pat. No. 6,119,083.

In other cases, for example testing in the laboratory, methods needing special test signals and/or access to the original signal could be used, and one could make use of the techniques described in WO94/00922 or WO00/22803 (for audio) or WO00/48407 (for video). A useful discussion of these quality measurement methods is also set out in Rix A W, Hollier M P, 'The perceptual analysis measurement system for robust end-to-end speech quality assessment', Proceedings of 2000 International Conference on Acoustics, Speech and Signal Processing, 5–9 Jun. 2000, IEEE, pp 1515–18 vol.3; and Rix, A W, Bourret, A, Hollier, M P 'Models of human perception', BTTJ, vol.17, No. 1, 24–34.

The particular algorithm that needs to be used for the combiner 11 will of course depend on the properties of the actual methods used for producing the individual video and audio quality measurements. These can readily be derived from subjective test material: an example of such a procedure is as follows.

1. A number of test sequences of audiovisual material are used—perhaps two sequences, of 5 seconds duration each. Degraded versions of the sequences are prepared: for the audio, four different levels of Modulated Noise Reference Units (as defined in ITU Recommendation P.810) are applied, whilst for the video, degradation can be effected by manipulating the degree of blockiness present in the picture. For example a moderate degradation can be effected by replacing every group of 2 picture elements (pixels) with one pixel equal to the average of the two, whilst severe degradation can be effected by replacing every 8×8 block with one pixel whose colour is the mean of the replaced pixels.
2. Each of the sixteen degraded sequences represented by different combinations of audio and video degradation is measured as described above to produce measures of audio and video quality.
3. Each sequence is viewed by a human subject and rated as to overall quality on a scale of 0 to 100: conveniently this might be done by having the subject point to a position on a bar on a computer display, and having the computer translate the position on the bar into a number.
4. This procedure is repeated for a number of subjects and the results averaged. across the subjects and for the two different test sequences.
5. The individual machine-measured and the combined subjective measurements are subjected to a regression analysis to determine the values of the coefficients a, b, c.
6. Having performed this procedure for low-motion material it is then repeated for high-motion material.

What is claimed is:

1. A method of measuring audio-visual signal quality, said method comprising:
   (a) analyzing an audio signal component of an audio-visual signal to produce an audio quality measurement;
   (b) analyzing a video signal component of an audio-visual signal to produce a video quality measurement;
   (c) providing a parameter indicative of the degree of motion represented by the video signal component;
   (d) computing, from the audio quality measurement and video quality measurement, a single measurement of audio-visual signal quality employing one of a plurality of algorithms selected in dependence on the value of the parameter; and
   (e) outputting a measurement of audio-visual signal quality based on step (d).

2. A method as in claim 1 in which step (d) comprises:
   computing, from the audio quality measurement and video quality measurement, a single measurement of audio-visual signal quality by employing an algorithm in which the contributions of the audio signal quality measurement and the video signal quality measurement are weighed in dependence on the value of the parameter.

3. A method as in claim 1 including analyzing the video signal component to generate the parameter.

4. A method for analyzing audio-visual signal quality, said method comprising:

processing an audio-visual signal to obtain a measure of its quality based on use of at least two different processes which are each selectively employed at different times in dependence upon a detected degree of motion represented by a video signal component of the audio visual signal; and outputting a signal representing audio-visual signal quality based on said measure.

5. A method as in claim 4 wherein said different processes differently weight contributions to said measure from an audio component and a video component of said audio-visual signal in dependence upon said detected degree of motion.

6. A method as in claim 5 wherein contributions to said measure from said video component are more highly weighted when the detected degree of motion therein is above a predetermined threshold.

7. A method as in claim 5 wherein each said process for generating said measure combines (a) a portion "a" of video component quality $Q_V$ with (b) a portion "b" of the product of video component quality $Q_V$ and audio component quality $Q_A$ and (c) a constant value "c"; wherein "a", "b" and "c" are changed as a function of said detected degree of motion.

* * * * *